United States Patent [19]

Farlow

[11] Patent Number: 4,464,048
[45] Date of Patent: Aug. 7, 1984

[54] LASER RANGEFINDERS

[75] Inventor: Adrian R. Farlow, Glasgow, Scotland

[73] Assignee: Barr & Stroud Limited, Glasgow, Scotland

[21] Appl. No.: 354,910

[22] Filed: Mar. 4, 1982

[30] Foreign Application Priority Data

Mar. 25, 1981 [GB] United Kingdom ............... 8109051

[51] Int. Cl.³ .................... G01C 3/08; H01J 40/14
[52] U.S. Cl. ............................... 356/5; 250/214 B
[58] Field of Search ...................... 356/5; 250/214 B

[56] References Cited

U.S. PATENT DOCUMENTS 3,869,207  3/1975  Hermet et al. ......................... 356/5
4,068,222  1/1978  Treviranus ............................ 356/5
4,181,431  1/1980  Chaborski ............................. 356/5

Primary Examiner—S. C. Buczinski
Attorney, Agent, or Firm—Mason, Fenwick & Lawrence

[57] ABSTRACT

A laser rangefinder comprises a transmitter (19) controlled by sequence-controlled pulses emitted by a timer (16) following actuation of a switch (17) by an operator. The receiver of the rangefinder comprises an avalanche photodiode (APD) (10) the sensitivity of which is controlled in a time-programmed manner by a bias voltage controller (11) which receives timing pulses from the timer (16). The time-programmed control operates to render the APD 10 insensitive to protect the receiver against optical element backscatter and atmospheric backscatter prior to rendering the APD 10 sensitive to monitor return pulses from remote targets. Optimum performance of the APD 10 is achieved by provision of a monitor circuit (24) which in combination with controller (11) establishes the breakdown voltage of the APD 10 at the temperature prevailing on each occasion immediately prior to firing of the laser transmitter (19) and derives therefrom the corresponding APD operating voltage to be achieved when the APD 10 next becomes sensitive for return pulse monitoring, this operating voltage being a fixed fraction of the previously established APD breakdown voltage. In one arrangement for implementing circuit (24) the APD breakdown voltage is monitored by a first capacitor (C6) which is arranged to function as a voltage source during the time-programmed operation and during this operation a second capacitor (C5) is connected in parallel with the APD 10 and in series with capacitor (C6) whereby the APD operating voltage is determined by capacitor (C5).

4 Claims, 4 Drawing Figures

LASER RANGEFINDERS

This invention relates to laser rangefinders.

Laser rangefinders comprise a transmitter incorporating a laser with circuitry to control and time the laser output pulse, and a receiver incorporating an optical pulse detector with electronic counting circuitry arranged to count clock pulses for the time interval between transmitted and received optical pulses in order to provide a range measurement from the rangefinder of a target reflecting back the transmitted laser pulse.

For many years the preferred type of detector has been an avalanche photodiode (APD) because of its internal gain characteristic, but for optimum performance the APD has had to be biassed to an operating voltage known to be temperature dependent if the gain of the photodiode is to be maintained constant. Thus known rangefinder receivers incorporate circuitry for adjusting the bias voltage. There are two common techniques for doing this: one is to use temperature compensation to adjust the supply voltage to the biassing circuitry; the other is to monitor the noise level from the detector output signal and servo control the bias voltage to minimise the noise level.

The rangefinder receiver is commonly subjected to unwanted optical signals arising, for example, from backscatter from a transmitted pulse which may be caused either by optical elements forming part of the rangefinder or by atmospheric conditions. To overcome the optical element backscatter problem known receivers incorporate a gate in the amplifier chain between the detector and the counting circuitry whereby transmission of the detector output signal to the counting circuitry can be blocked or prevented for a predetermined time period (the minimum range period) following firing of the laser transmitter. This time period is sufficiently long to eliminate noise pulses due to the backscatter radiation reaching the counting circuitry but sufficiently short to permit a return pulse from a target at minimum range being transmitted to the counting circuitry. To eliminate the atmospheric backscatter problem the amplifier chain also includes a time programmed gain (TPG) stage which is effective for a predetermined time period immediately following the minimum range period to maintain the receiver sensitivity below its normal level thereby preventing atmospheric backscatter affecting the counting circuitry whilst permitting target return pulses being transmitted to the counting circuitry. Because the gate and the TPG stage are usually located after a preamplifier stage (with low input impedance) the photodiode and the preamplifier stage is still subjected to the backscatter radiation and each may become overloaded for a sufficiently long time to be in an overloaded or saturated condition after the gate has been opened and thereby adversely affecting the operation of the receiver, particularly in relation to signals reflected from short range targets.

It is an object of the present invention to provide in a laser rangefinder receiver an improved form of control circuitry for the detector.

According to the present invention there is provided a laser rangefinder wherein the receiver comprises an avalanche photodiode and wherein the photodiode bias is provided by circuitry controlled from the laser transmitter to establish substantially zero bias voltage when the laser transmitter is fired and to increase the bias voltage during a predetermined time interval thereafter to establish a final bias voltage substantially equal to a fixed percentage below the breakdown voltage of the photodiode, said circuitry incorporating means to determine said breakdown voltage at the operating temperature prevailing immediately prior to firing of the laser transmitter.

We have found that with presently available avalanche photodiodes which have a quantum efficiency which increases with temperature (for example Silicon based) the manufacturers recommended operating voltage and the breakdown voltage (which are unique to each photodiode) always have the relationship that operating voltage is a fixed percentage below breakdown voltage at an ambient temperature of 22° C. In the case of RCA C30895 photodiodes this is 10%. We have also discovered that by maintaining this relationship for all operating temperatures in the case of RCA C30895 photodiodes the Shott noise produced by the photodiode is maintained within acceptable limits even at elevated temperatures whilst the quantum efficiency of the photodiode increases with temperature to substantially the same extent as the internal gain decreases so that the photodiode operates with substantially constant responsivity (proportional to quantum efficiency X internal gain). The invention however is not limited in its application to those photodiodes which have a quantum efficiency which increases with temperature since it produces improved results in comparison to the known arrangements when applied to photodiodes having a quantum efficiency which decreases with temperature.

An embodiment of the present invention will now be described by way of example with reference to the accompanying drawings, in which.

Figure 1:
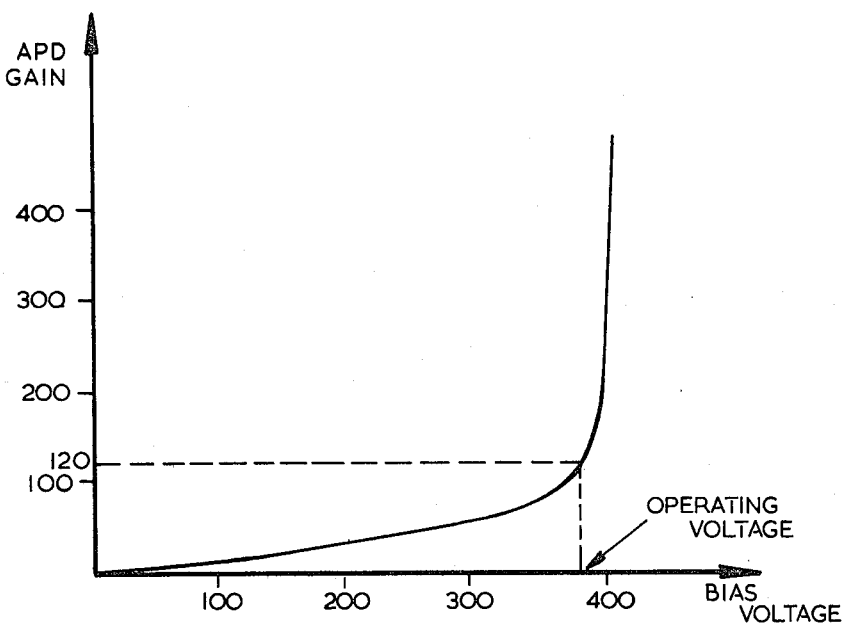
FIG. 1 illustrates a gain bias voltage characteristic for a typical avalanche photodiode.

As is shown in FIG. 1 a typical avalanche photodiode characteristic has gradually increasing gain with increasing bias voltage up to about 350 volts, within the bias voltage range of 350–390 or so the gain rapidly increases from about 80 to about 150, and for bias voltages slightly in excess of 390 the gain rapidly escalates to about 400. The breakdown voltage of the photodiode is determined by each manufacturer as that at which a current of about 5 $\mu$A flows and by way of example for an RCA C30895 this lies in the range 355–460 volts at 22° C. and changes at the rate of +2.2 V/°C. The operating voltage (for an RCA C30895) is given by the manufacturer as being that at which the gain is 120 at 22° C.

Figure 2:
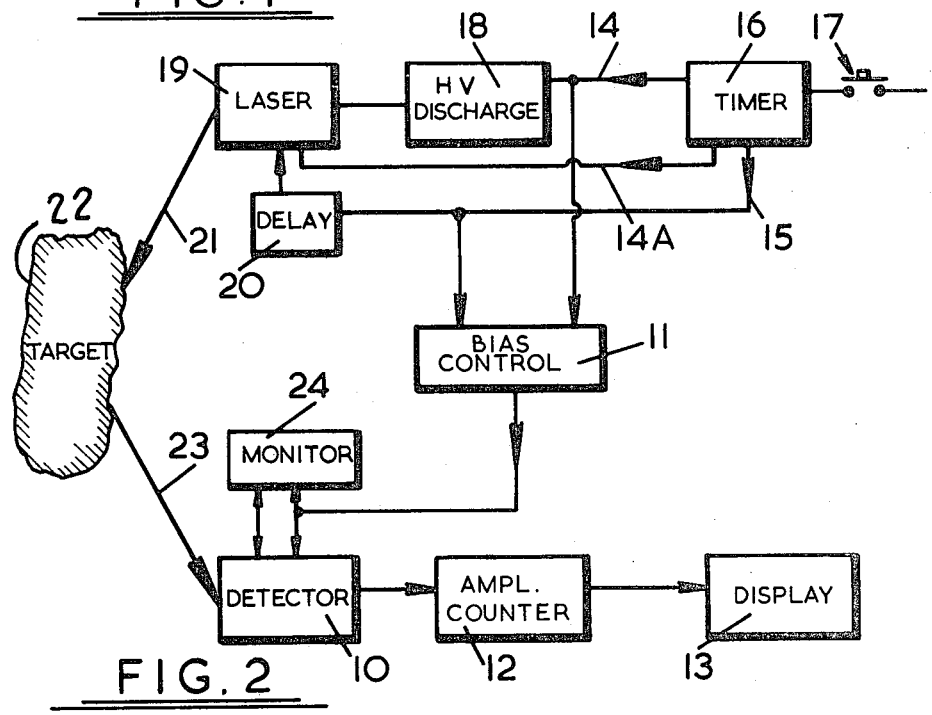
FIG. 2 illustrates in block diagrammatic form a laser rangefinder according to the present invention.

The rangefinder shown in block form in FIG. 2 utilises an avalanche photodetector of this type in block 10 the bias voltage of which is determined by control circuitry 11 and the output of the detector is fed to amplifying and counting stages 12 which drive a range display 13. Control circuitry 11, as will be explained, is controlled by outputs 14 and 15 of a timer 16 which is enabled by switch 17 under the influence of an operator.

When energized, timer 16 outputs a charge-enable signal on output 14 conveniently of 50 ms duration which is transmitted to HV charge circuit 18. Subsequently timer 16 produces on output 14A a 250 $\mu$s control pulse to trigger the laser flash tube which subsequently outputs a 100 $\mu$s pulse that excites the lasing medium of laser 19. Subsequently to the 250 μs control pulse timer 16 provides an enable signal on output 15 of 100 μs duration which is delayed by 100 ns by delay 20 the output of which operates a Q switch within laser 19 and results in a laser output pulse 21 after the operational delay of the Q switch which usually is of the order of 300 ns. After reflection from target 22 the laser pulse 21 or at least the reflected part of it, 23, is received by detector 10.

Control circuitry 11 is arranged so that on receipt of the 50 ms enable signal on output 14 it derives a temporary supply voltage considerably in excess of the breakdown voltage of detector 10, for example 600 volts, and makes this supply voltage available to the detector 10 and to a device 24 for determining the breakdown voltage of the detector 10 this being the bias voltage established across the detector 10 by the device 24. On subsequent receipt of the 100 μs enable pulse on output 15 circuitry 11 causes the bias voltage applied to the detector 10 by device 24 to be reduced to zero after about 200 ns, i.e. immediately prior to laser 19 firing and to thereafter increase at a controlled rate to only 90% of the bias voltage previously established by device 24. This controlled rate results in a smooth increase in receiver sensitivity between 2 μs and X μs after the laser is fired. Thus the photodiode has no appreciable gain during the 2 μs time interval that optical element backscatter radiation might be expected from the output of the laser 19 and reduced gain during the 2 μs to X μs time interval that atmospheric backscatter radiation might be expected. After a predetermined time interval from receipt of the signal on output 15 circuitry 11 causes the bias voltage on photodiode 10 to be increased from the operating voltage level towards the breakdown voltage level and eventually this level reduces to zero as the supply voltage reduces to zero prior to receipt of a subsequent 50 ms charge enable signal.

Because there is zero bias on the detector at the instant when the laser is fired the possibility of the detector being damaged by backscatter is greatly reduced and there is no danger of the amplifiers being saturated at the beginning of the ranging period. Furthermore at the end of the X μs period the bias on the detector will be close to the manufacturers recommended operating voltage for maximum sensitivity.

Figure 3:
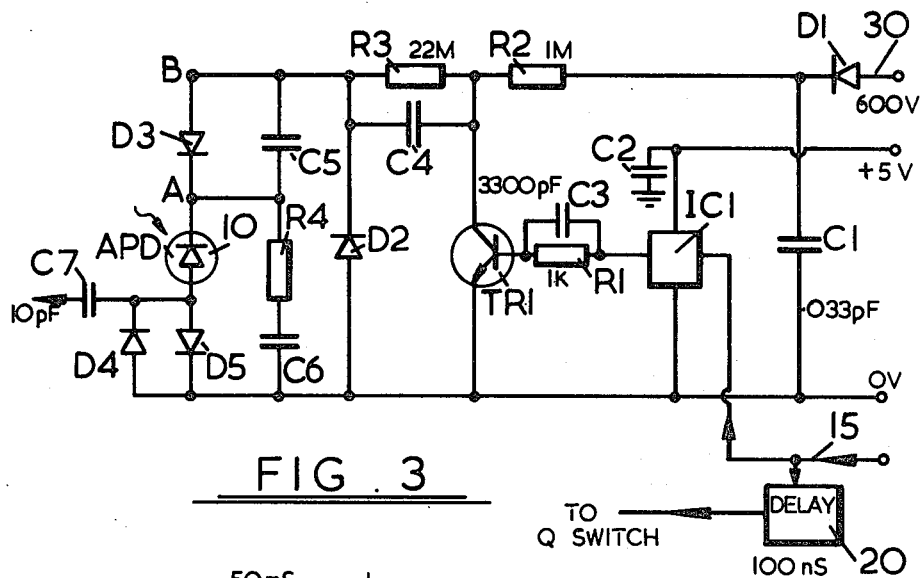
FIG. 3 is a circuit diagram of an APD bias circuit forming part of the FIG. 2 rangefinder.
Figure 4:
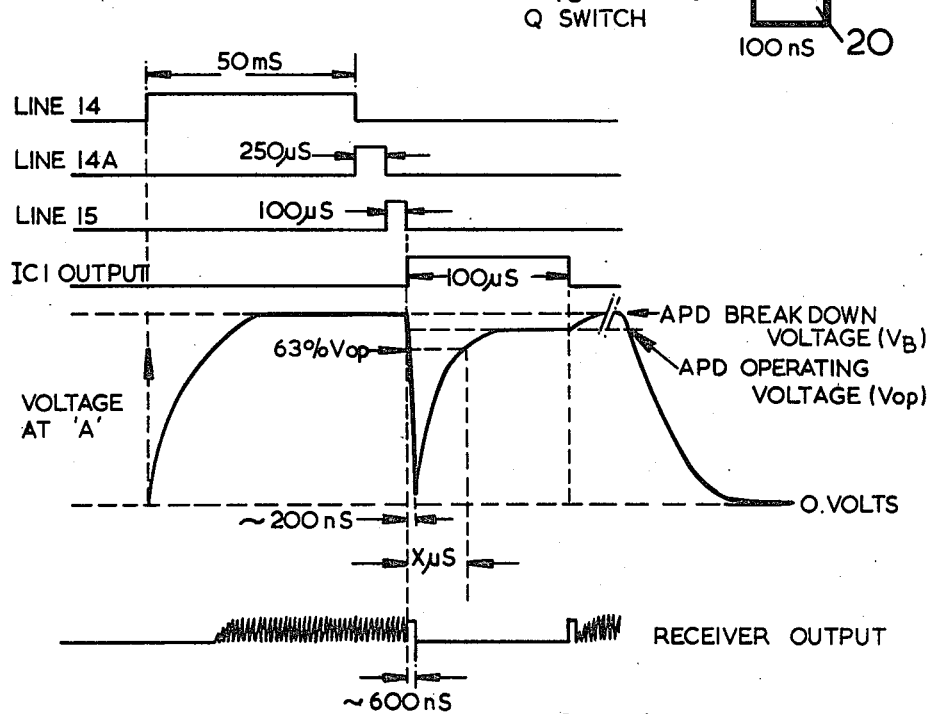
FIG. 4 is a waveform diagram relevant to FIG. 3.

Particular circuitry for performing the foregoing operations is illustrated schematically in FIG. 3 with pertinent waveforms being shown in FIG. 4. As shown in FIG. 3 capacitor C1 is charged to about 600 v via diode D1 from line 30 being the output of a voltage dropper, whose input is connected to the output of the charger circuit 18 (see FIG. 2), when a 50 ms charge enable pulse is generated by timer 16. Capacitor C1 acts as a supply for biassing the photodiode 10 and the bias voltage as seen at point A in FIG. 3 increases from zero to the breakdown voltage level with a time constant $T_1 = R_2 \cdot C_6$. This results from the presence of diode $D_3$ bypassing capacitor $C_5$, capacitor $C_4$ bypassing resistor $R_3$ and resistor $R_4$ being very much smaller in value than resistor $R_2$. $R_3$ is provided to limit the photodiode current to less than 100 μA at the breakdown voltage level and for an RCA C30895 photodiode requires to be 22M ohms. This however restricts the growth rate of the bias voltage at point A for this reason capacitor $C_4$ is provided having a value which is approximately 10 times greater than capacitor $C_6$. Accordingly capacitor $C_6$ is restricted to charge up to about 90% of the supply voltage on capacitor $C_1$ i.e. to about 540 volts which is in excess of the breakdown voltage of the photodiode 10, but when the photodiode reaches the breakdown level the voltage on capacitor $C_6$ is limited and is maintained at the breakdown level.

During this operation IC1, which is a D-type monostable, has zero output and holds transistor TR1 in its nonconducting state. IC1 is triggered by the enable signal on output 15 (FIG. 2) and produces a 100 μs gating pulse to turn on transistor TR1. Resistor $R_1$ is for current limiting and capacitor $C_3$ is a speed-up capacitor. When transistor TR1 is turned on points A and B are rapidly brought to zero volts but are prevented from going negative by diode $D_2$ as capacitor $C_5$ attempts to charge up to the voltage level stored by capacitor $C_6$ with a time constant $T_2 = C_5 \times R_4$. $C_6$ however is in series with $C_5$ with respect to the charging current and because $C_6:C_5 = 10:1$ the voltage ultimately stored across $C_5$ is limited to 90% of the breakdown voltage which is the selected operating voltage for the photodiode. At the end of the gating pulse provided by IC1 transistor TR1 is rendered non conducting so that the supply voltage of capacitor $C_1$ is again applied to point A resulting in an increased level of bias voltage which gradually reduces to zero as the charge stored in capacitor $C_1$ is dissipated through the photodiode.

The video-output of the photodiode 10 is taken from the anode via capacitor $C_7$ (10 pF) which in combination with reverse-poled diodes $D_4$, $D_5$ prevents large transient pulses of either polarity being fed to the amplifier and counter 12 (FIG. 2). Diode $D_1$ prevents capacitor $C_1$ discharging back through output 14.

It will now be appreciated that in the circuit of FIG. 3 capacitor $C_6$ functions to measure the breakdown voltage level of the photodiode at whatever temperature the device is operating at and IC1 and TR1 together operate to control the bias voltage so that there is zero bias voltage when the laser fires, thus protecting against optical element backscatter and thereafter operating in a manner similar to time-programmed-gain principles such that the photodiode is rendered operative with a reduced sensitivity when atmospheric backscatter would be expected, and thereafter holding the bias voltage at the operating voltage level for a duration sufficient to monitor return pulses from remote range targets before again becoming inoperative. The net result is that the photodiode functions with an almost linear gain/time characteristic reaching maximum gain (120) in a time interval of 3.5 $T_2$ with the receiver system gain reduced by more than 40 dB at the beginning of the ranging period.

I claim:

1. A laser rangefinder having a transmitter and a receiver, wherein the receiver comprises an avalanche photodiode the bias voltage of which is provided by circuitry controlled in time from the laser transmitter to establish substantially zero bias voltage when the transmitter is fired and to increase the bias voltage during a predetermined time interval therafter to establish a final bias voltage substantially equal to a fixed percentage below the breakdown voltage of the photodiode prevailing immediately prior to firing of the laser transmitter, said circuitry incorporating means to determine said breakdown voltage at the operating temperature prevailing immediately prior to firing of the laser transmitter.

2. A laser rangefinder as claimed in claim 1, wherein said circuitry comprises a first voltage source having a level substantially in excess of said breakdown voltage and applicable to said photodiode immediately prior to firing of the laser transmitter to establish the breakdown voltage than prevailing.

3. A laser rangefinder as claimed in claim 2, wherein said determining means is arranged to function as a second voltage source for said photodiode during said predetermined time interval.

4. A laser rangefinder as claimed in claim 2, wherein said determining means comprises a first capacitor connected in parallel with said photodiode when said first voltage source is applied thereto for determining said breakdown voltage and said circuitry comprises a switching device which is controlled in time by the laser transmitter and which when actuated causes said first capacitor to function as a second voltage source, a second capacitor being connected in parallel with said photodiode by said switching device whereby the relative capacitive values of said first and second capacitors determine said percentage.

* * * * *